Patented May 8, 1923.

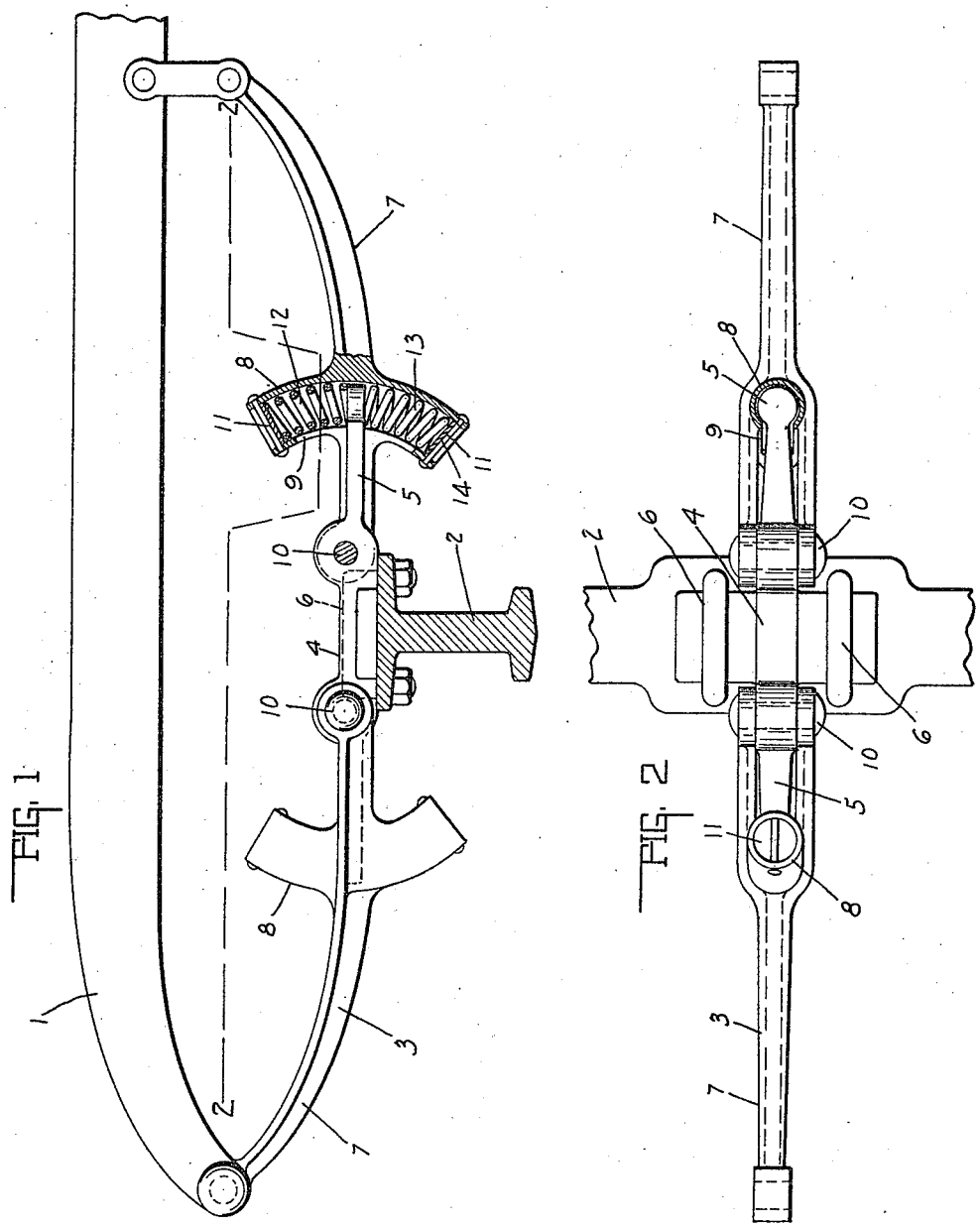

1,454,535

UNITED STATES PATENT OFFICE.

BENJAMIN F. BURNS, OF KOKOMO, INDIANA, ASSIGNOR OF ONE-THIRD TO JOHN W. HARBAUGH, OF KOKOMO, INDIANA.

SHOCK ABSORBER.

Application filed February 4, 1922. Serial No. 534,119.

*To all whom it may concern:*

Be it known that I, BENJAMIN F. BURNS, a citizen of the United States, residing at Kokomo, in the county of Howard and State of Indiana, have invented certain new and useful Improvements in Shock Absorbers, of which the following is a specification.

This invention relates to shock absorbers and particularly of that class to be used in connection with automobiles and similar vehicles for absorbing any shock incident to the travel of the vehicle, and also to eliminate excess rebound of the parts of the vehicle. In vehicles of this class it is customary to provide an elliptical or a semi-elliptical spring over the front and rear axles of the vehicle to which the frame of the vehicle is attached; but, in the present instance this form of spring is entirely dispensed with and shock absorber constructions substituted therefor which are so arranged that any shock delivered to the wheels of the vehicle will be assimilated before it is imparted to the body portion of the vehicle, and any excess rebound controlled and eliminated.

A further feature of the invention is in so constructing the parts of the shock absorber, and in so arranging the shock absorbing and rebound springs in co-operation with said parts, that the axle will have a more or less floating action without imparting such action to the body of the vehicle.

And a further feature of the invention is in so constructing the various parts of the shock absorber construction that they may be readily substituted for the usual form of body supporting spring.

Other objects and advantages will be hereinafter more fully set forth and pointed out in the accompanying specification.

In the accompanying drawings,

Figure 1 is a side elevation of one side rail of an automobile frame, and the forward axle of a vehicle showing a combined shock absorber and rebound check applied thereto, parts being shown in section, and Figure 2 is a detail top plan view partly in section as seen on line 2—2, Figure 1.

Referring to the drawings, 1 indicates the usual form of frame or chassis of an automobile, and 2 the front axle of an automobile which is preferably in I-beam formation. Instead of applying a spring between the frame 1 and the axle 2, as is customary, the shock absorber device 3 is substituted therefor, which is composed of a body portion 4, from each edge of which are extended fixed arms 5, the body portion 4 being clamped upon the axle 2 in any suitable manner, as by means of clips 6. Associated with the body portion 4 are levers 7, the inner ends of which are bifurcated, and said bifurcated ends are passed along the side edges of the arms 5 and are pivoted to said arms at points adjacent the connection of the arms with the body portion. The outer ends of the levers 7 are connected with the frame 1 in the usual or any preferred manner, so that the frame and body carried thereby may have the usual movement with respect to the axle 2.

In order to assimilate any shocks directed against the wheels of the vehicle, and at the same time provide a yielding and cushioning support for the frame parts carried thereby, each lever 7 is provided with a housing 8, which preferably projects a uniform distance above and below the levers, one face of each housing having a slot 9 through which the ends of the arms 5 project, and said housings are arranged in the arc of a circle incident to the radius from the center of the pivotal connections 10 between the body portion 4 and the bifurcated ends of the levers 7, and the axial center of the housing 8, consequently the ends of the arms 5 entering the housings will remain in axial alignment with the housings during the rocking movement of said levers.

Entered within the upper portions of the housings 8 between the ends of the arms 5 and stops 11, at the upper ends of the housings, are shock absorber springs 12, said shock absorber springs being arranged to carry the normal load placed upon the frame of the vehicle, the action of said shock absorbing springs being identical with the usual form of body spring in carrying such loads as may be placed thereon. Should the wheels of the vehicle receive a blow, as by striking an obstruction or dropping into an excavation, the axle will move upwardly, and consequently compress the shock absorber springs, such shock being practically absorbed by the shock absorber springs before the force of the shock is delivered to the frame of the vehicle, thereby permitting a more or less floating action of the axle without effecting the movement or action of the body supporting frame of the vehicle.

In addition to providing shock absorber springs, rebound springs 13 may be introduced into the lower portions of the housings 8 and between the under faces of the arms 5 and the stops 14 at the lower ends of the housings, the tension of the latter springs being such as to absorb and practically eliminate excess rebound of any parts of the vehicle, thereby fully stabilizing the moving action of all parts of the vehicle and eliminating all excess shocks or rebounds.

In this form of device, when a load is placed on the frame 1, the levers 7 will pivot on the pivots 10 with the result that such load will be directed against the springs 12, and as said springs are constructed to carry weights in proportion to the ordinary body springs, the action of the frame on the axle in either case will be practically identical, but with this form of device the axle will have a more independent floating action than will result through the use of the ordinary body spring.

Having thus fully described my said invention, what I claim as new and desire to secure by Letters Patent, is:

1. The combination with the frame and axle of a vehicle, of a shock absorber construction comprising a pair of arms extending transversely of the axle and beyond opposite edges thereof, levers having bifurcated ends pivoted to said arms and having connection at their opposite ends with said frame, means for holding the arms in fixed position on the axle, a housing integral with each lever and extending above and below the lever at the juncture of the bifurcated and main portions of the lever, said housing being slotted for the passage of said arms, and a pair of shock absorbing springs in each housing one above and one below each arm adapted to support the frame and assimilate shock imparted to the axle.

2. The combination with the frame and axle of a vehicle, of a shock absorber construction comprising a pair of arms extending transversely of the axle and on opposite sides thereof, levers having bifurcated ends passing on opposite sides of and pivoted to said arms and having connection at their opposite ends with said frame, means for holding the arms in fixed position on the axle, a housing on each lever at the juncture of said bifurcated ends with the levers and extending above and below the levers, a shock absorbing spring in each housing above said levers adapted to support the frame and assimilate shock imparted to the axle and rebound springs in said housings below said arms for checking rebound of the frame or axle.

In witness whereof, I have hereunto set my hand and seal at Indianapolis, Indiana, this 1st day of February, A. D. nineteen hundred and twenty-two.

BENJAMIN F. BURNS. [L. S.]

Witnesses:
CAREY S. FRYE,
M. L. SHULER.